J. W. DIXON.
CAN HEAD FEEDING MACHINE.
APPLICATION FILED DEC. 28, 1911.
1,154,237.
Patented Sept. 21, 1915.
2 SHEETS—SHEET 1.
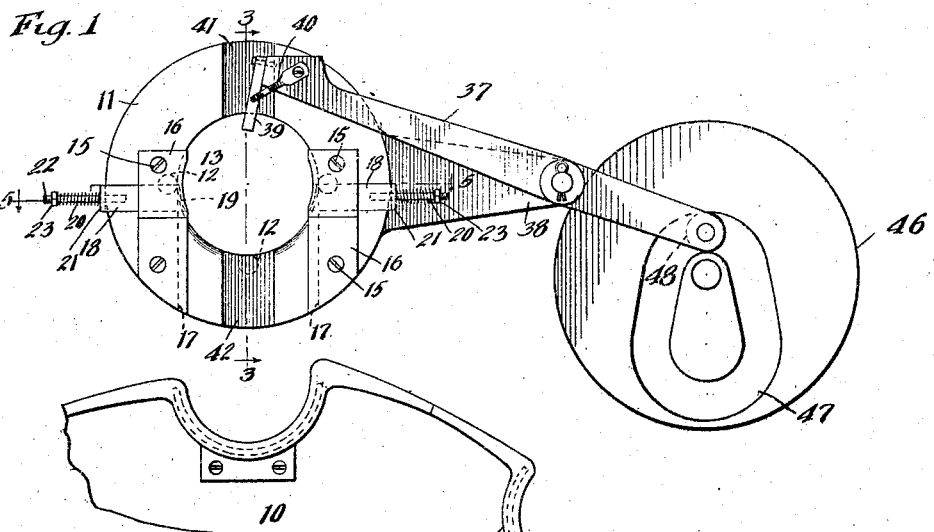
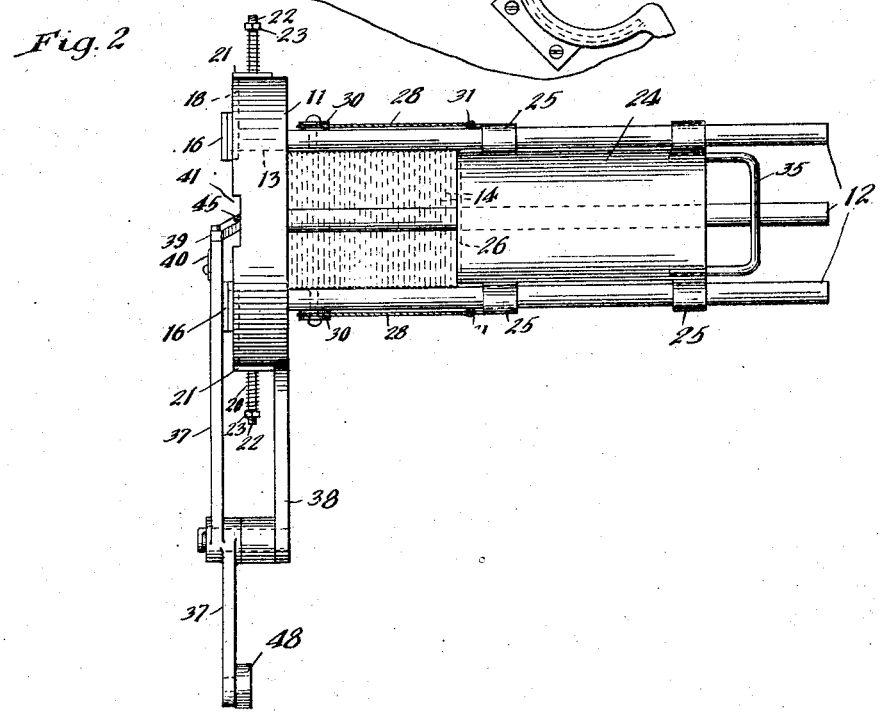

J. W. DIXON.
CAN HEAD FEEDING MACHINE.
APPLICATION FILED DEC. 28, 1911.
1,154,237.
Patented Sept. 21, 1915.
2 SHEETS—SHEET 2.
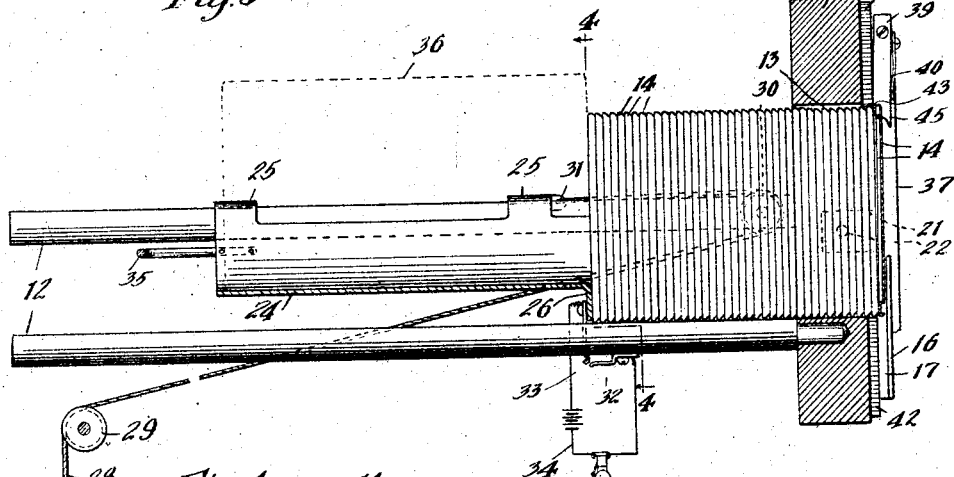
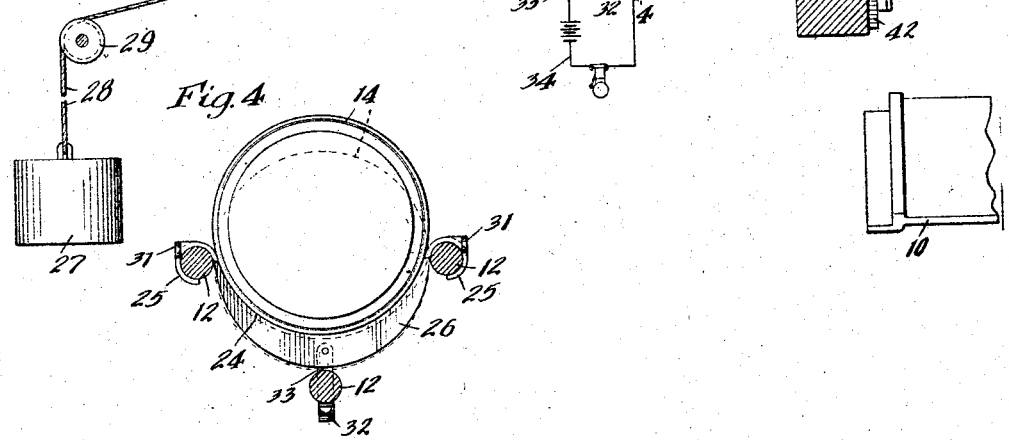
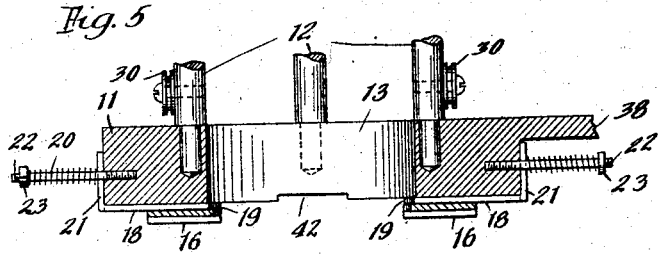
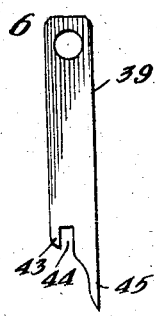
Witnesses:
Wm. Geiger
H. W. Munday
Inventor
James W. Dixon
By Munday, Evarts, Adcock & Clark.
Attys

UNITED STATES PATENT OFFICE.

JAMES W. DIXON, OF CHICAGO, ILLINOIS, ASSIGNOR TO AMERICAN CAN COMPANY, OF NEW YORK, N. Y., A CORPORATION OF NEW JERSEY.

CAN-HEAD-FEEDING MACHINE.

1,154,237.  Specification of Letters Patent.  Patented Sept. 21, 1915.

Application filed December 28, 1911. Serial No. 668,240.

*To all whom it may concern:*

Be it known that I, JAMES W. DIXON, a citizen of the United States, residing in Austin, Chicago, in the county of Cook and State of Illinois, have invented a new and useful Improvement in Can-Head-Feeding Machines, of which the following is a specification.

This invention relates to means for feeding can heads or similar articles from a stack one at a time.

The invention has been designed more particularly for use in connection with the feeding of can heads for sanitary cans, in which the heads are generally provided with a layer of packing or sealing material in the groove around the edge, but it will be evident that the invention may also be used for feeding other kinds of can heads and similar articles.

Hitherto, great difficulty has been experienced in feeding such heads one at a time from a stack, especially by screw thread feeds or similar type feeds, because of the fact that the packing or sealing material, which is generally of a sticky or gummy substance, causes the can heads to stick together, and even when a head is separated from the main portion of the stack, the packing material will stretch sometimes several inches before it finally breaks and allows the separated can head to fall freely.

My improved mechanism, positively separates each can head from the remainder of the stack to such an extent that any sticking together of two can heads does not affect the speed and operation of the device, and my mechanism is also of an exceedingly simple character, having few parts, and can be operated at very high speed, and in experiments, I have operated it to feed successfully as high as three hundred heads per minute, but in actual practice, a speed of one hundred and fifty heads per minute will be as high as is necessary.

I have shown my improvements as adapted to feed heads from a horizontally disposed stack to a machine rotatable about a horizontal axis, but it will be evident that the improvements may also be used to feed heads from stacks in other positions and to other types of machines.

My invention furthermore consists in the improvements in the parts and devices and in the combinations of parts and devices herein shown, described and made the subject matter of the claims.

In the drawing forming a part of this specification, Figure 1 is an end elevation of a can head feeder embodying my improvements, showing the same adjacent a carrier of any well known type of double seaming machine. Fig. 2 is a plan view of the structure, shown in Fig. 1, the cam having been omitted. Fig. 3 is a longitudinal, vertical section upon an enlarged scale, taken on the line 3—3 of Fig. 1. Fig. 4 is a transverse, vertical section, taken substantially on the line 4—4 of Fig. 3. Fig. 5 is a horizontal, transverse section, upon an enlarged scale, taken on the line 5—5 of Fig. 1, and Fig. 6 is a detail view of the feed finger employed in my mechanism.

In the drawing, 10 denotes the carrier of any well known form of machine to which the can heads are adapted to be fed. Disposed adjacent to the carrier 10 is my improved can head feeder, which comprises a head or plate 11 having secured thereto means for holding and guiding a stack of can heads, said means, as illustrated, comprising three parallel bars 12 arranged in the form of a semi circle. The head 11 is provided with a circular recess 13, having a diameter slightly larger than that of the can heads 14 to be fed. The rods 12 are so disposed as to have their inner edges concentric with the recess 13, so that the can heads will slide easily from the rods 12 into the recess in the head or plate 11. Mounted on the outer face of the plate 11, as by means of screws 15, are stop plates 16, one on each side of the recess 13. Each of the plates 16, where the same extends over the recess 13, is provided with a cut out portion 17 of substantially a depth equal to the thickness of a can head, so that the outward movement of the can heads is stopped by the plates, but so arranged that the outermost can head may be slid downwardly over the face of the plate 11 and guided by the cut out portions 17. Also located on the outer face of the head or plate 11 below the horizontal diameter of the recess 13 are slidable plates 18, each of said plates 18 extending inwardly slightly beyond the sides of the recess 13, and having their inner ends 19 curved and each adapted to engage the edge of the outermost can head of the stack, and hold said head from falling. Each of the plates 18 slides in a guide between the plates 16 and the outer face of the head 11 and is normally spring pressed inwardly by means of a spring 20 engaging an arm 21 of the plate 18, said spring 20 being located on a bolt 22 and adapted to have its tension adjusted by means of a nut 23 threaded on the bolt 22.

The stack of can heads is normally pressed outwardly through the recess 13 by means of a semi-cylindrical member 24 which is guided and supported on the upper pair of rods 12 by means of bent over hooks 25. The semi-cylindric member 24 is provided on its front end with a depending segmental flange 26, adapted to engage the lowermost portions of the inner can head of the stack. The member 24 is normally forced against the stack of can heads by means of weights 27 attached to ropes 28 which run over idlers 29 and 30, and which are at their other ends attached to the member 24 as at 31. I have shown means which will warn the operator when the supply of can heads in the stack is getting low, said means comprising an insulated member 32, attached to the lower bar or rod 12, and a contact 33 attached to the movable member 24, said members 32 and 33, when in contact, being adapted to close an electric bell circuit indicated as 34. On the rear of the member 24 is a handle 35 by means of which the operator may retract the member 24 while he is putting in an additional supply of can heads.

An important feature of my invention consists in having the member 24 disposed above the lower rod 12 so that additional heads may be placed in the guides 12 without stopping the movements of the cutting out mechanism at the end of the head, since it will be evident that the operator may place an additional supply of heads, such as indicated by the dotted lines 36 in Fig. 3, in the member 24, and hold said heads 36 up against the remainder of the stack in the guides 12, while at the same time withdrawing the member 24 by means of the handle 35, and thus at all times keeping the outermost head of the stack against the stop plates 16. To cut out the outermost head, I provide a lever 37, pivoted to head 11, said lever 37 having, at its inner end, pivotally mounted thereon, a feed finger 39, said feed finger 39 being normally spring pressed inwardly against the end of the stack and can heads, as by means of a spring 40. As will be noted from the drawing, the feed finger 39 is movable or oscillates in planes which are perpendicular to the planes of the can ends. The head or plate 11 is provided with two vertically extending grooves 41 and 42 in which the finger 39 is adapted to reciprocate. The finger 39 is provided with a cut-out tooth 43 which is adapted to pass between the upper edges of the outermost can head and the one next to it, and has a slotted portion 44 adapted to engage the upper edge of the outermost can head and push the same downwardly, thus forcing the plates 18 apart and allowing the outermost can head to fall. The finger 39 is furthermore provided with a depending portion 45, adapted to fit the outer face of the can heads and to ride over the same to properly position the finger, so that the tooth 43 will engage between the two outer can heads. Movement is given to the lever 37 by any suitable means, such, for instance, as a cam 46, having a cam groove 47 therein adapted to engage a roller 48 on the outer end of the lever 37.

In operation, the finger 39 engages the outermost can head and pushes the same down against the action of the plates 18 and as the outermost can head passes down below the center of the recess 13, the remainder of the stack of can heads will be pushed outwardly and stopped by means of the stop plates 16, and the outermost head of the stack again caught and held by means of the spring pressed members 18. The finger 39, having completed its downward stroke, and having pushed the outermost can head beyond the bottom of the plate 11, is then retracted to a point where the tooth 43 is slightly above the uppermost edge of the can head now in position between the plates 18, and on account of the design of the portion 45 of the finger, upon a downward stroke, the tooth 43 will be again properly guided to a position between the two outer can heads of the stack.

I have described one form of my invention, but I wish it to be understood that the same is merely illustrative, and that various changes and modifications may be made without departing from the spirit of the invention, and all such changes and modifications are contemplated as fairly come within the scope of the appended claims.

I claim:—

1. A device for feeding articles from a stack, one at a time, including, in combination: a substantially horizontally arranged open-ended stack holder adapted to support the articles vertically on edge; a feeding member adapted to flex the endmost article of the stack relative to and away from the end of the stack, said member being movable back and forth across one edge of the end of the stack, and also having means to engage the edge of the article; means for moving said feeding member transversely to the axis of the stack to feed the article so engaged; and means for pushing the stack in a substantially horizontal direction toward the point where the articles are separated one by one from the stack.

2. In a device for feeding can heads and similar articles from a stack one at a time, in combination, a stack holder having a perforated head through which the heads are adapted to pass, a lever pivoted adjacent said head, a finger pivotally mounted on said lever and oscillatable in a plane perpendicular to the plane of the adjacent can head, said finger being adapted to cut out one head at a time from the stack and movable over the end of the stack, and means for oscillating said lever.

3. In a device for feeding can heads and similar articles from a stack one at a time, a horizontally disposed stack holder comprising a vertical plate at one end, said plate having a recess therein conforming in shape and size to the can heads, a lever pivoted adjacent said plate and having a yieldingly mounted finger thereon adapted to be moved back and forth over the end of the stack and cut out one head at a time.

4. In a device for feeding can heads and similar articles from a stack one at a time, in combination, a horizontally disposed stack holder comprising a plate at one end having a recess therein through which the can heads are adapted to pass, a stop for preventing more than the outermost head in the stack from being moved beyond said recess, movable means for preventing accidental downward movement of said outermost head in its projected position, and means for pushing the outermost head downwardly.

5. In a device for feeding can heads and similar articles from a stack one at a time, in combination, a horizontally disposed stack holder comprising a plate at one end having a recess therein through which the can heads are adapted to pass, a stop for preventing more than the outermost head in the stack from being moved beyond said recess, movable means for preventing accidental downward movement of said outermost head in its projected position, means for pushing the outermost head downwardly, and means for forcing the stack toward said stop.

6. In a device for feeding can heads and similar articles from a stack one at a time, in combination, a horizontally disposed stack holder comprising a plate at one end having a recess therein through which the can heads are adapted to pass, a stop for preventing more than the outer-most head in the stack from being moved beyond said recess, yieldingly mounted means for preventing accidental downward movement of said outermost head in its projected position, and means for pushing the outermost head downwardly, thereby moving the yieldingly mounted means to allow the outermost can head to pass.

7. In a device for feeding can heads and similar articles from a stack one at a time, in combination, a stack holder having a perforated head at one end thereof through which the can heads are adapted to pass, rigidly mounted means spaced from said head a distance equal to the thickness of a can head, said means projecting over the recess in the head to thereby form a stop to engage the end head of the stack, holding means including a yieldingly mounted member located between the head and said means and adapted to engage the edge of the outermost can head, and movable means adapted to engage the edge of the outermost can head and push the same past the yieldingly mounted member.

8. In a device for feeding can heads and similar articles from a stack one at a time, in combination, a stack holder having a perforated head at one end thereof through which the can heads are adapted to pass, rigidly mounted means spaced from said head a distance equal to the thickness of a can head, said means projecting over the recess in the head to thereby form a stop to engage the end head of the stack, holding means including a yieldingly mounted member located between the head and said means and adapted to engage the edge of the outermost can head, and a movable member having a yieldingly mounted finger thereon adapted to engage the edge of the outermost can head and cut the same out from the remainder of the stack and push it past said yieldingly mounted member.

9. In a device for feeding can heads and similar articles from a stack one at a time, in combination, a stack holder having a perforated head at one end thereof through which the heads are adapted to pass, a stop plate spaced from said head a distance equal to the thickness of a can head and extending over the aperture in the head, holding means including a slidable plate mounted between said stop plate and the head and normally yieldingly projecting inwardly beyond the edge of the aperture, and adapted to engage a portion of the edge of the outermost can head of the stack and prevent the same from dropping, and a movable member having a yieldingly mounted finger thereon, said finger having a tooth adapted to engage between the outermost can head and the one adjacent thereto, and having also a portion adapted to engage the edge of the outermost can head.

10. In a device for feeding can heads and similar articles from a stack one at a time, in combination, a stack holder having a perforated head at one end thereof through which the heads are adapted to pass, a stop plate spaced from said head a distance equal to the thickness of a can head and extending over the aperture in the head, holding means including a slidable plate mounted between said stop plate and the head and normally yieldingly projected inwardly beyond the edge of the aperture, and adapted to engage the edge of the outermost can head of the stack, and a lever pivoted adjacent said head, said lever having pivotally mounted thereon a spring pressed finger, and means for oscillating said lever.

11. In a device for feeding can heads and similar articles from a stack one at a time, in combination, a stack holder having a perforated head at one end thereof through which the heads are adapted to pass, a stop plate spaced from said head a distance equal to the thickness of a can head and extending over the aperture in the head, holding means including a slidable plate mounted between said stop plate and the head and normally yieldingly projecting inwardly beyond the edge of the aperture, and adapted to engage a portion of the edge of the outermost can head of the stack and prevent the same from dropping, a movable member having a yieldingly mounted finger thereon, said finger having a tooth adapted to engage between the outermost can head and the one adjacent thereto, and having also a portion adapted to engage the edge of the outermost can head, and means for pressing the stack outwardly against the stop plate.

12. In a device for feeding can heads and similar articles from a stack one at a time, in combination, a stack holder having a perforated head at one end thereof through which the heads are adapted to pass, a stop plate spaced from said head a distance equal to the thickness of a can head and extending over the aperture in the head, holding means including a slidable plate mounted between said stop plate and the head and normally yieldingly projected inwardly beyond the edge of the aperture, and adapted to engage the edge of the outermost can head of the stack, a lever pivoted adjacent said head, said lever having pivotally mounted thereon a spring pressed finger, means for oscillating said lever, and means for pressing the stack outwardly against the stop plate.

13. In a device for feeding can heads and similar articles from a stack one at a time, in combination, a stack holder having a perforated head at one end thereof through which the heads are adapted to pass, a pair of stop plates having portions thereof spaced from said head a distance equal to the thickness of a can head and located on opposite sides of the aperture in the head, and extending partially thereacross, a pair of slidable plates mounted on opposite sides of the aperture and each located intermediate one of the stop plates and the head, and each normally yieldingly projected inwardly beyond the edge of the aperture and adapted to engage a portion of the edge of the outermost can head of the stack, and a movable member having mounted thereon a pivoted finger, said finger having a tooth adapted to engage between the outermost can head and the one adjacent thereto and having also a portion adapted to engage the edge of the outermost can head and push the same.

14. In a device for feeding articles from a stack, one at a time, in combination: a horizontally arranged stack holder comprising means for supporting and guiding the stack proper and a slidably mounted substantially semi-cylindrical, auxiliary stack supporting member movable relatively to said means and adapted to support a reserve supply of articles, said member being arranged so as to have its outermost end engage the innermost article of the main stack to thereby push the latter horizontally along the stack holder; and means for cutting out the outermost articles, one at a time, from the end of the stack, substantially as specified.

15. In a device for feeding can heads and similar articles from a stack one at a time, in combination, a stack holder having a head at one end thereof, said head being provided with a recess conforming in shape and size to the heads, a stop plate having a portion thereof spaced from said head a distance equal to the thickness of a can head and extending over the recess in the head, holding means including a plate slidably mounted between said stop plate and the head and normally yieldingly projected inwardly beyond the edge of the recess, and being adapted to engage a portion of the edge of the outermost can head of the stack below the center line, a movable member adjacent said head, said movable member having a yieldingly mounted finger thereon, and means for moving said member.

JAMES W. DIXON.

Witnesses:
PEARL ABRAMS,
H. M. MUNDAY.